United States Patent [19]
Chu

[11] Patent Number: 6,032,462
[45] Date of Patent: Mar. 7, 2000

[54] APPARATUS FOR CLEANING VEHICLE EXHAUST GASES

[76] Inventor: Rey-Chin Chu, No. 68, Alley 76, Lane 600, Wu-shin Street, Taipei, Taiwan

[21] Appl. No.: 08/972,323

[22] Filed: Nov. 18, 1997

[51] Int. Cl.[7] .................................................. F01N 3/04
[52] U.S. Cl. .............................. 60/310; 55/225; 55/248; 55/249; 55/DIG. 30
[58] Field of Search ............................ 60/298, 297, 310; 55/225, 248, 249, DIG. 30, 223

[56] References Cited

U.S. PATENT DOCUMENTS

| | | | |
|---|---|---|---|
| 3,353,335 | 11/1967 | Caballero | 60/310 |
| 3,353,336 | 11/1967 | Caballero | 60/310 |
| 3,485,015 | 12/1969 | Vecchio | 60/310 |
| 3,615,074 | 10/1971 | Cook | 60/310 |
| 3,712,031 | 1/1973 | Santa Cruz | 55/DIG. 30 |
| 3,742,682 | 7/1973 | Ligutom | 55/223 |
| 4,783,958 | 11/1988 | Borja | 55/248 |

Primary Examiner—Thomas E. Denion
Attorney, Agent, or Firm—Bacon & Thomas, PLLC

[57] ABSTRACT

An apparatus is disclosed for cleansing and filtering exhaust gas of a vehicle having an internal combustion engine including an exhaust gas cleansing chamber having an exhaust gas inlet and an exhaust gas outlet, the exhaust gas inlet connected to the exhaust pipe of an internal combustion engine, a vaporizer connected to the exhaust pipe so as to introduce water vapor into the exhaust gas before the exhaust gas enters the exhaust gas cleansing chamber, and a sprinkler connected to the exhaust gas cleansing chamber so as to provide a spray curtain of water between the exhaust gas inlet and the exhaust gas outlet to filter impurities from and reduce the temperature of the exhaust gas.

13 Claims, 6 Drawing Sheets

APPARATUS FOR CLEANING VEHICLE EXHAUST GASES

BACKGROUND OF THE INVENTION

The present invention relates to apparatus for cleansing exhaust gases from a vehicle having an internal combustion engine, more particularly such an apparatus wherein the exhaust gases of the vehicle are passed through a water spray.

Pollution from the exhaust of vehicles has caused serious air quality problems, especially in populated areas with heavy traffic. Such pollution has caused the "greenhouse" effect, and the pollution and toxic particles from such exhaust is everywhere. Vehicle exhaust is one of the major causes of such poor air quality, especially in large cities.

Many countries have adopted different policies and restrictions on vehicles in order to improve the air quality, such as using unleaded gasoline and requiring the use of catalytic converters. But, due to various reasons, these policies have not completely resolved the air pollution problem.

SUMMARY OF THE INVENTION

An apparatus is disclosed for cleansing and filtering exhaust gas of a vehicle having an internal combustion engine including an exhaust gas cleansing chamber having an exhaust gas inlet and an exhaust gas outlet, the exhaust gas inlet connected to the exhaust pipe of an internal combustion engine, a vaporizer connected to the exhaust pipe so as to introduce water vapor into the exhaust gas before the exhaust gas enters the exhaust gas cleansing chamber, and a sprinkler connected to the exhaust gas cleansing chamber so as to provide a spray curtain of water between the exhaust gas inlet and the exhaust gas outlet to filter impurities from and reduce the temperature of the exhaust gas.

The apparatus also includes a main water tank containing a water supply in which is also located the exhaust gas chamber, the vaporizer and the sprinkler being connected to the main water tank. The water supply is connected to a cooling coil and water is circulated through the cooling coil by a motor driven pump. The cooling coil may extend around the outer surface of the main water tank and supplies water to the sprinkler and then to the vaporizer. After the water is sprayed into the exhaust gas flow, the contaminated water passes downwardly and returns into the water supply and is recirculated to the sprinkler. The sprinkler has a filter which filters out the impurities and cleans the water prior to it being sprayed into the exhaust gas cleansing chamber. A removable top of the sprinkler facilitates the cleaning and replacement of the filter.

The vaporizer may include a Venturi tube through which the exhaust gases pass and a vaporizing tank having a quantity of water. A connecting pipe extends between the vaporizer tank and the throat of the Venturi tube such that the low pressure generated in the Venturi tube throat draws water into the exhaust gas flow from the vaporizer tank. After passing through the exhaust gas cleansing chamber, the cleaned exhaust gases pass through the exhaust gas outlet. The exhaust gas has not only been cleansed, but the exiting temperatures have also been reduced by contact with the cooled water.

DETAILED DESCRIPTION OF THE PREFERRED EMBODIMENT

Figure 1:
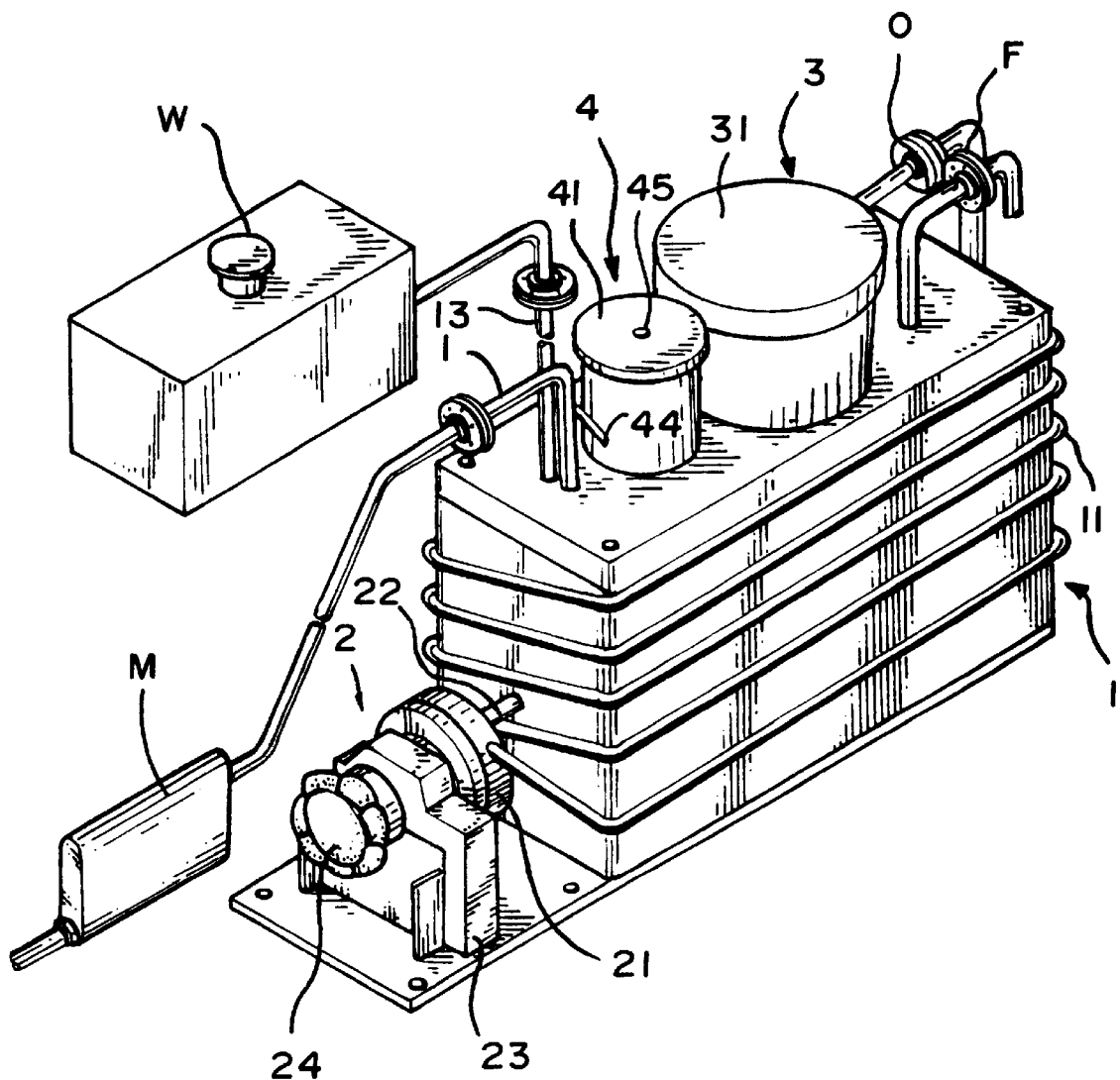
FIG. 1 is a perspective view of the filtering and cleansing apparatus according to the present invention.
Figure 2:
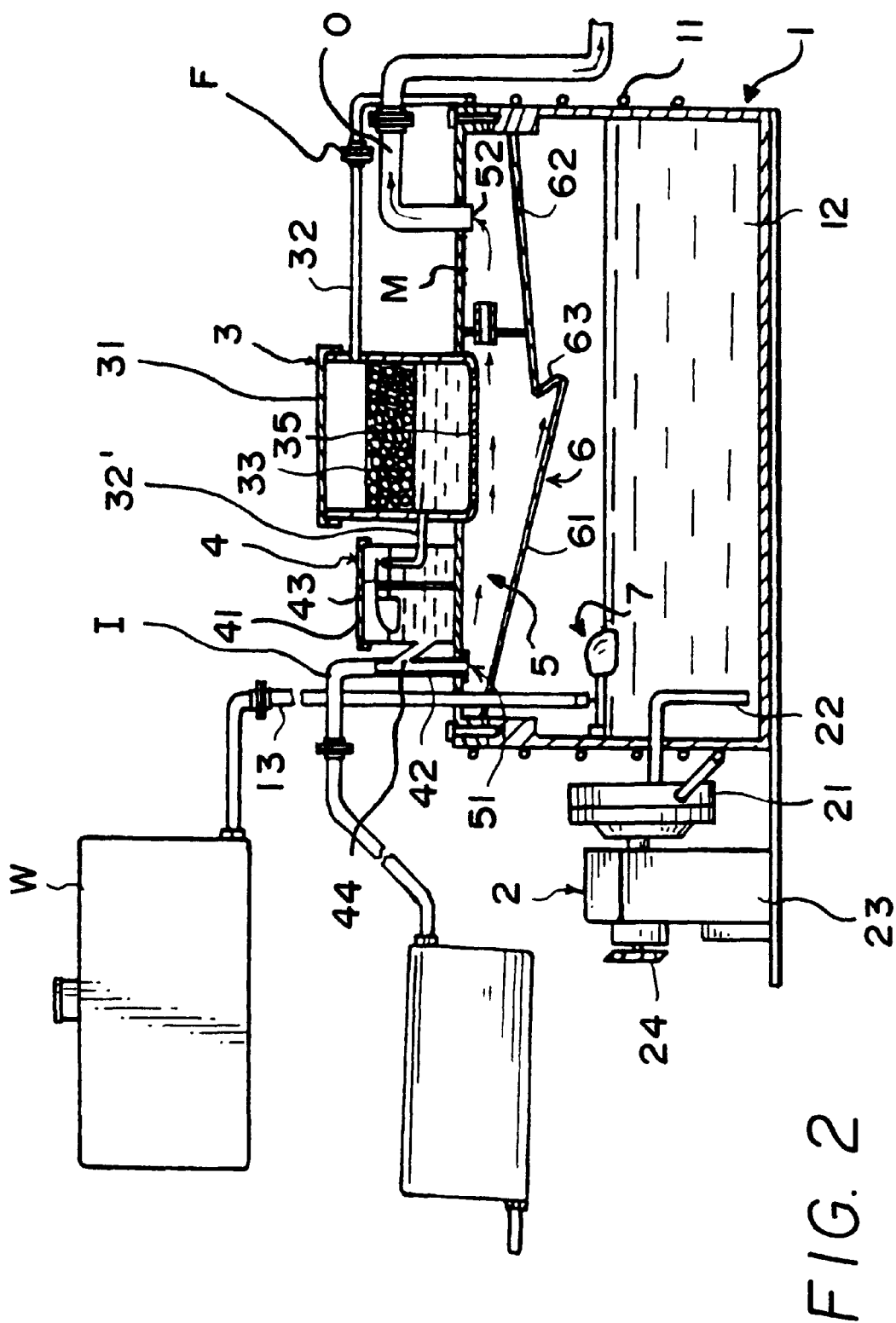
FIG. 2 is a side view, partially in cross-section of the apparatus illustrated in FIG. 1.
Figure 3:
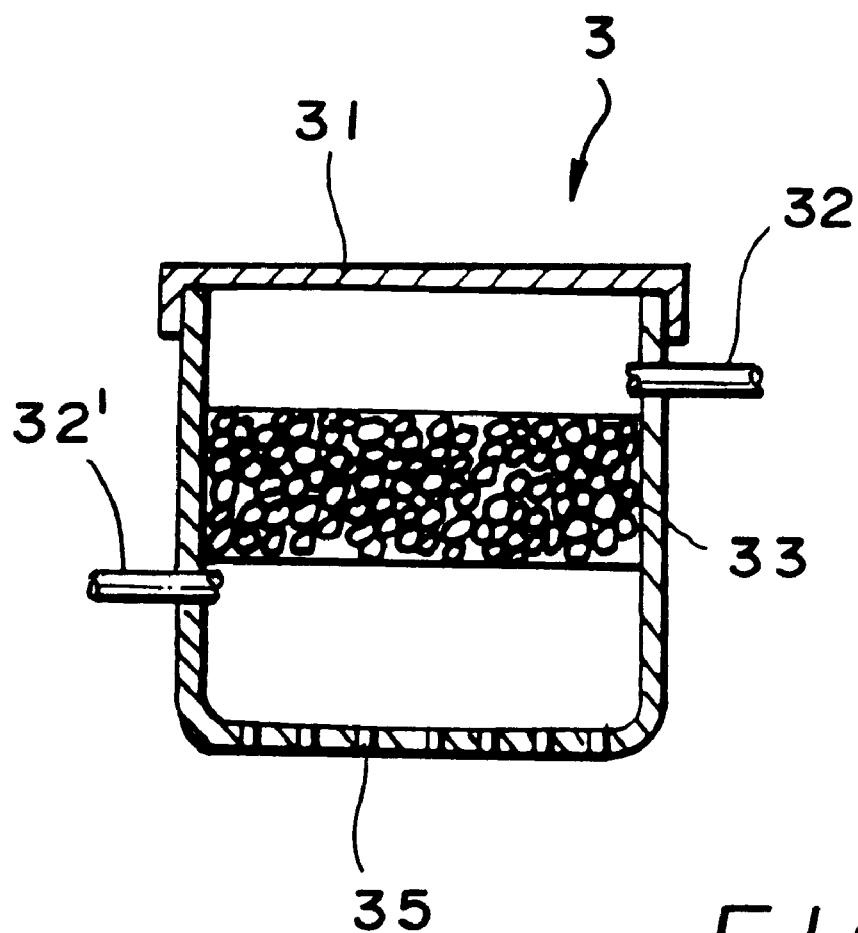
FIG. 3 is a cross-sectional view of the sprinkler utilized in the present apparatus.

The overall structure of the present invention is illustrated in FIGS. 1 and 2 and comprises a main water supply tank 1, a water circulation device 2 which includes a water pump 21, a water pump hose 22, a motor 23 driving the water pump 21 and a cooling fan 24. A sprinkler 3 is located on a top surface of the main water supply tank 1, as is vaporizer 4. A cooling coil 11 extends around the outer surface of the main water supply tank 1 and extends between the water pump 21 and the sprinkler 3 by way of pipe connection F and the sprinkler inlet tube 32. Sprinkler 3 has cover 31 removably attached thereto so as to seal the interior of the sprinkler 3 in which is located filter 33. The bottom of the sprinkler 3 has a plurality of holes 35 therein which communicate with the exhaust gas cleansing chamber 5, located within the confines of main water supply tank 1. Vaporizer 4 has cover. 41 attached thereto, the cover 41 having a hole 45 therein enabling the ambient atmosphere to communicate with the interior of the vaporizer tank thereby equalizing the pressure between the interior of the vaporizer tank and the ambient pressure.

The exhaust gases from the internal combustion engine (not shown) pass through muffler M, in known fashion, and enter the exhaust gas cleansing chamber 5 via exhaust inlet pipe I. Exhaust gas cleansing chamber 5 has exhaust gas inlet 51 and exhaust gas outlet 52 which communicates with the exhaust gas outlet pipe O. As best seen in FIG. 2, the exhaust gases entering through the exhaust gas inlet 51 pass through the exhaust gas cleansing chamber 5 in the direction of the arrows.

The lower portion of the main water supply tank 1 comprises a sump 12 holding the main water supply. The water is withdrawn from the water sump 12 by the water pump 21 via the water pump hose 22 and is circulated through the cooling coil 11 by the water pump 21. Although the main water supply tank 1 is illustrated as being generally rectangular in cross-sectional configuration, it is to be understood that other shapes may be utilized without exceeding the scope of this invention.

Water from the cooling coil 11 passes into an upper portion of the sprinkler 3 via sprinkler inlet tube 32 and passes through filter 33. Filter 33 filters the water passing therethrough so as to remove the impurities, particulate material, etc. After passing through the filter 33, the water enters the bottom portion of the sprinkler 3 and a portion passes through the holes 35 so as to form a water spray curtain across the exhaust gas cleansing chamber 5 generally perpendicular to the direction of flow of the exhaust gases through the chamber. The water spray curtain flushes the impurities from the exhaust gases acting as a filter and also reduces the temperatures of the exhaust gases. After filtering, the contaminated water contacts the guiding board 61 forming a lower boundary of the exhaust gas cleansing chamber which is oriented so as to direct the contaminated water to flow toward stopper board 63 and return to the water sump 12 via openings either in the guiding board 61 or the stopper board 63. When the thusly contaminated water is re-circulated from the sump 12, the filter 33 removes the contaminates therefrom such that the exhaust gases are cleansed by clean water.

Although the cooling coil 11 is illustrated as being disposed directly around the main water supply tank, it is within the scope of this invention to locate the water cooling coil at other locations in the vehicle so as to facilitate the exposure of the cooling coil to air flow during operation of the vehicle.

Although the cover 31 of the sprinkler 3 seals the interior of the sprinkler, it is to be understood that the cover 31 is easily removable so as to facilitate cleaning and/or changing of the filter 33. The attachment of the cover 31 should be sufficient to accommodate any pressure generated by the water pump 21. Such pressure urges the water through the holes 35 to form a spray curtain or screen to ensure that all of the exhaust gases pass through the spray curtain.

Figure 4:
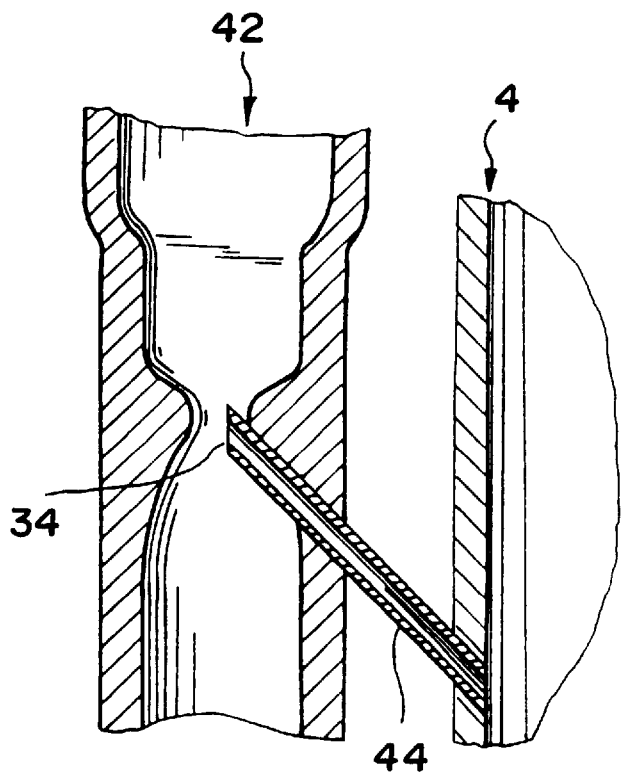
FIG. 4 is a partial, cross-sectional view illustrating the Venturi tube and its connection to the vaporizer according to the present invention.

Water tube 32' connects the lower portion of the sprinkler 3 (downstream of the filter 33) to the vaporizer tank of the vaporizer 4. As best seen in FIGS. 2 and 4, the exhaust inlet pipe I has a Venturi tube section 42 which, in known fashion, has a throat with a reduced cross-sectional area to increase the velocity of the gas flow through the throat and thereby create a low pressure area. The low pressure throat area is connected to the Venturi tank by connecting tube 44. The low pressure generated in the Venturi throat will draw water from the vaporizer tank through the connecting tube 44 caused by the difference in air pressure between the Venturi throat and the interior of the vaporizer tank. Water colliding with the exhaust gas at relatively high speed causes the vaporized water to mix with the exhaust gas. This reduces the temperature of the exhaust gas and mixes the exhaust gas particles with the water vapor causing them to enlarge and to be heavier in weight, thereby rendering them more easily removed from the exhaust gas when the exhaust gas pass through the water spray curtain.

Figure 5:
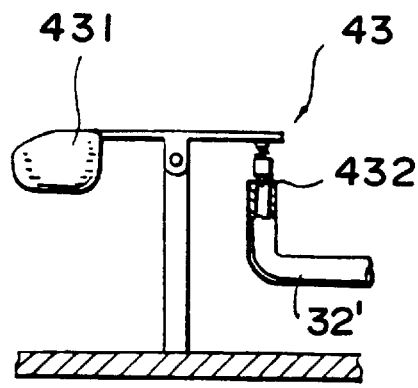
FIG. 5 is a side view, partially in cross-section, illustrating a float-control valve which controls the water level in the vaporizer tank.

The water level in the vaporizer tank is controlled by control device 43, best illustrated in FIGS. 2 and 5. As can be seen, the end of water tube 32' is movably contacted by needle valve element 432 so as to open and close the water inlet tube 32'. The valve element 432 is connected to a float 431 such that, when the water level in the vaporizer tank reaches a predetermined level, the needle valve 432 will close the end of the water inlet tube 32' and, when the water level drops below a predetermined level, the valve element 432 will be moved away from the end of the tube 32' to thereby enable more water to enter the vaporizer tank. As illustrated in FIG. 2, the connecting tube 44 communicates with the vaporizer tank below the water level.

Figure 6:
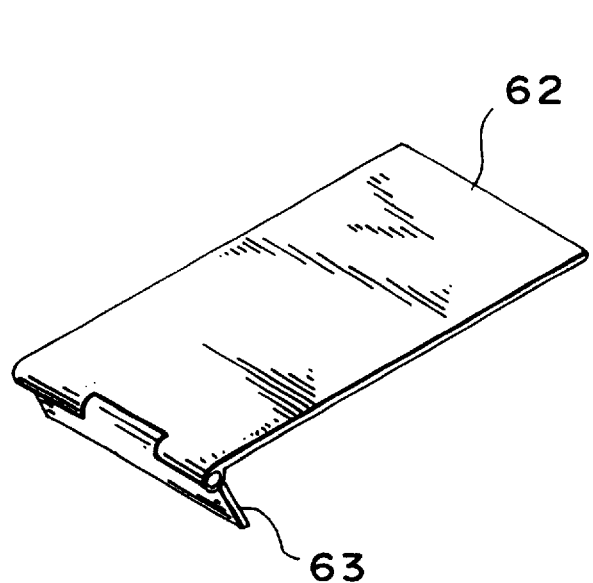
FIG. 6 is a perspective view of a portion of a wall bounding the bottom of the exhaust gas cleansing chamber according to the present invention.

The smoke insulation board 62 and the stopper board 63 are illustrated in FIG. 6. The stopper board 63 is oriented with respect to the guiding board 61 to prevent the water passing down the guide board 61 from splashing back upwardly into the exhaust gas cleansing chamber due to the vibration of the vehicle. Openings in the guiding board 61 enable the contaminated water to pass back into the sump 12.

Figure 7:
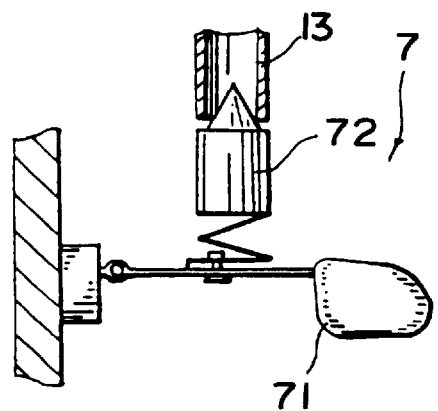
FIG. 7 is a side view, partially in cross-section, illustrating the float-control valve controlling the water level in the main water supply tank.

An auxiliary water supply tank W may be utilized, as illustrated in FIG. 2. This auxiliary water supply tank is connected to the main water supply tank 1 by water inlet pipe 13. The main water supply tank 1 has a water level control device to maintain the water level in the sump 12 at a predetermined level. The water control device is illustrated in FIG. 7 and comprises a needle valve element 72 movably engaging the end of the water inlet tube 13 and connected to a float 71. The positioning of these elements is such that, when the water level in the sump 12 rises above a predetermined level, the float 71 will cause the needle valve element 72 to close the end of the water inlet tube 13. When the water level in the sump 12 drops below a predetermined level, the float will cause the needle valve 72 to be withdrawn from the end of the water inlet tube 13 thereby enabling more water to flow into the main water supply tank. Water may be supplied from the auxiliary tank W to the main water supply tank 1 by gravity, as illustrated, or a separate water pump may be utilized.

Figure 8:
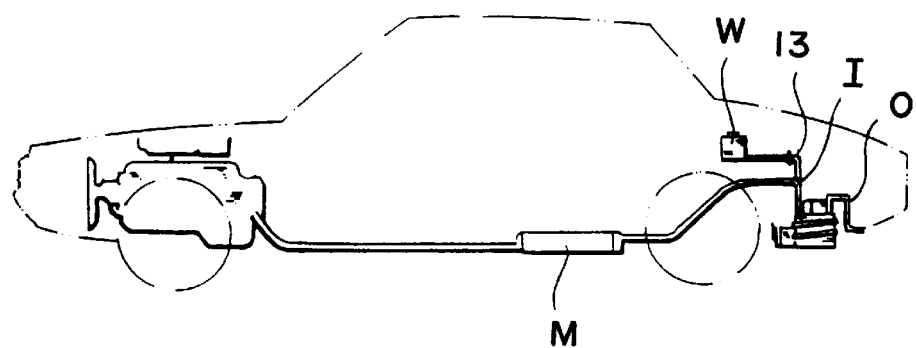
FIG. 8 is a schematic side view illustrating the use of the apparatus according to the present invention in a four-wheeled vehicle.
Figure 9:
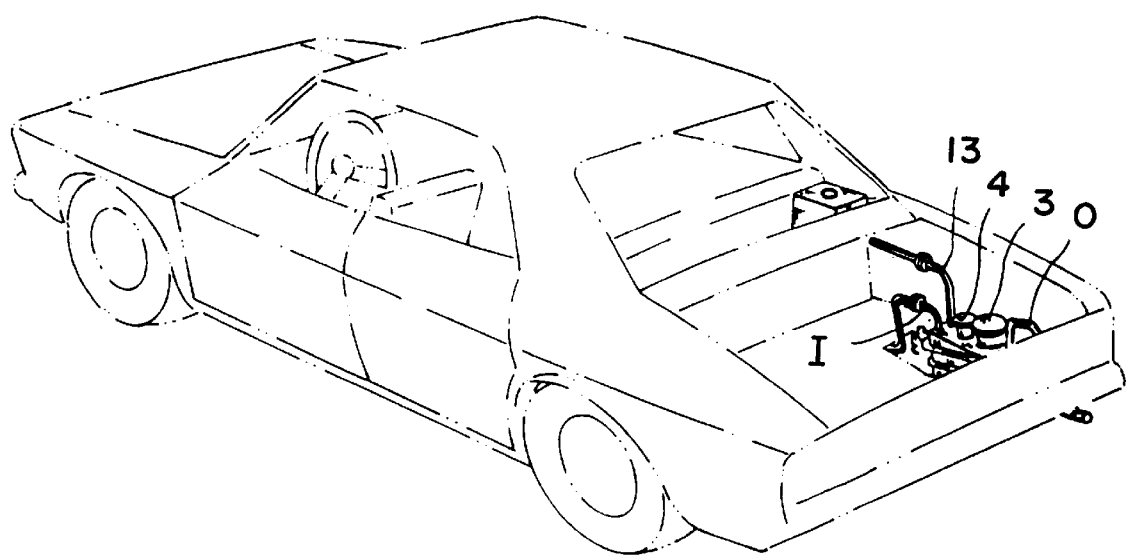
FIG. 9 is a schematic perspective view further illustrating the installation illustrated in FIG. 8.

FIGS. 8 and 9 are schematic diagrams illustrating the cleansing apparatus according to the present invention installed in a four-wheel vehicle. Quite obviously this installation is suggestive only and other locations and orientations of the various elements of the cleansing apparatus may be changed in orientation depending upon the particularities of each specific vehicle.

Figure 10:
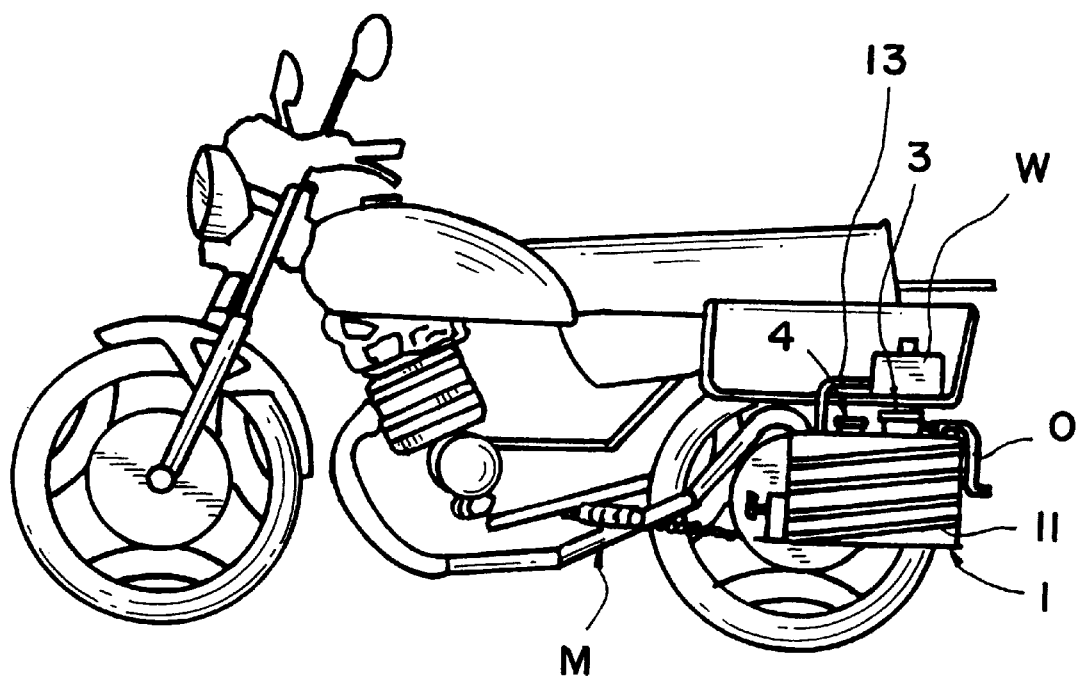
FIG. 10 is a side view of the apparatus according to the present invention utilized on a two-wheeled vehicle.

The apparatus can also be utilized on a two-wheel vehicle, such as a motorcycle, as illustrated in FIG. 10. Again, this illustration is suggestive only and depending upon each specific two-wheel vehicle configuration, the components may be differently oriented.

The foregoing description is provided for illustrative purposes only and should not be construed as in any way limiting this invention, the scope of which is defined solely by the appended claims.

What is claimed is:

1. Apparatus for cleansing exhaust gas from a vehicle having an internal combustion engine comprising:

a) an exhaust gas cleansing chamber having an exhaust gas inlet and an exhaust gas outlet, the exhaust gas inlet connected to an exhaust pipe of the internal combustion engine;

b) a vaporizer connected to the exhaust pipe so as to introduce water vapor into the exhaust gas before the exhaust gas enters the exhaust gas cleansing chamber, the vaporizer including a Venturi tube connected to the exhaust gas inlet, the Venturi tube having a throat with a reduced cross-sectional area, the exhaust gas flowing through the Venturi tube, a vaporizer tank having a supply of water therein, and a pipe connecting the vaporizer tank to the throat of the Venturi tube such that water passes into the Venturi tube in contact with the exhaust gas; and c) a sprinkler connected to the exhaust gas cleansing chamber so as to provide a spray curtain of water between the exhaust gas inlet and the exhaust gas outlet to flush impurities from the exhaust gas.

2. The cleansing apparatus of claim 1 further comprising a water supply connected to the sprinkler and to the vaporizer.

3. The cleansing apparatus of claim 2 further comprising a water pump for pumping water from the water supply to the sprinkler and to the vaporizer.

4. The cleansing apparatus of claim 3 further comprising a water cooling coil connected between the water pump, and the sprinkler and vaporizer.

5. The cleansing apparatus of claim 4 wherein the sprinkler further comprises a filter to filter water passing through the sprinkler.

6. Apparatus for cleansing exhaust gas from a vehicle having an internal combustion engine comprising:
   a) an exhaust gas cleansing chamber having an exhaust gas inlet and an exhaust gas outlet, the exhaust gas inlet connected to an exhaust pipe of the internal combustion engine;
   b) a vaporizer connected to the exhaust pipe so as to introduce water vapor into the exhaust gas before the exhaust gas enters the exhaust gas cleansing chamber;
   c) a sprinkler connected to the exhaust gas cleansing chamber so as to provide a spray curtain of water between the exhaust gas inlet and the exhaust gas outlet to flush impurities from the exhaust gas, the sprinkler further comprises a filter to filter water passing through the sprinkler;
   d) a water supply connected to the sprinkler and to the vaporizer, a main water tank containing the water supply, the exhaust gas cleansing chamber being located in the main water tank;
   e) a water pump for pumping water from the water supply to the sprinkler and to the vaporizer; and
   f) a water cooling coil connected between the water pump, the sprinkler and the vaporizer.

7. The cleansing apparatus of claim 6 further comprising a guiding board within the main water tank separating the exhaust gas chamber from the water supply, the guiding board having at least one opening enabling water to pass from the exhaust gas chamber to the water supply.

8. The cleansing apparatus of claim 7 wherein the sprinkler and the vaporizer are located on a top cover of the main water tank.

9. The cleansing apparatus of claim 7 wherein the vaporizer comprises:
   a) a Venturi tube connected to the exhaust pipe, the Venturi having a throat with a reduced cross-sectional area, the exhaust gas flowing through the Venturi tube;
   b) a vaporizer tank having a supply of water therein; and
   c) a connecting pipe connecting the vaporizer tank to the throat of the Venturi tube such that water passes into the Venturi tube in contact with the exhaust gas.

10. The cleansing apparatus of claim 8 further comprising a water level control in the vaporizer tank comprising:
    a) a water inlet pipe having an inlet end;
    b) a valve movably sealing the inlet end of the water inlet pipe; and,
    c) a float connected to the valve whereby the valve closes the inlet end of the water inlet when the water level in the vaporizer tank reaches a predetermined level and opens the inlet end when the water level drops below a predetermined level.

11. The cleansing apparatus of claim 6 wherein the water cooling coil wraps around an external surface of the main water tank.

12. The cleansing apparatus of claim 6 further comprising an auxiliary water supply tank connected to the main water supply tank.

13. The cleansing apparatus of claim 12 further comprising:
    a) a water supply tube connecting the auxiliary water supply tank to the main water supply tank, the water supply tube having an inlet end located within the main water supply tank;
    b) a movable valve to open and close the inlet end of the water supply tube; and,
    c) a float connected to the movable valve such that the inlet end is closed when the water level in the main water supply tank reaches a predetermined level and the inlet end is opened when the water level drops below a predetermined level.

* * * * *